Feb. 14, 1961   B. A. SHOOR   2,972,006
TESTING EQUIPMENT AND INSULATED MOUNTING STUD THEREFOR
Filed Nov. 3, 1958
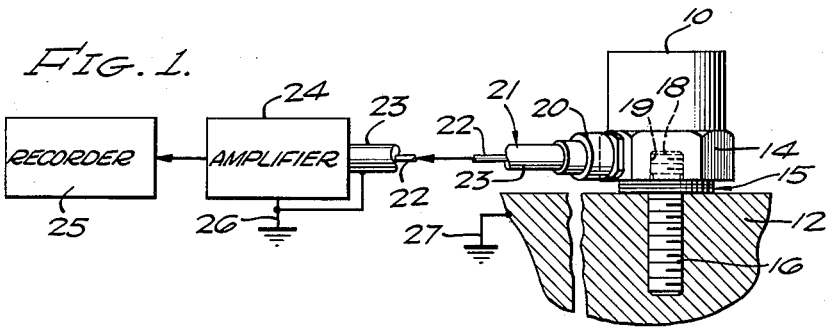
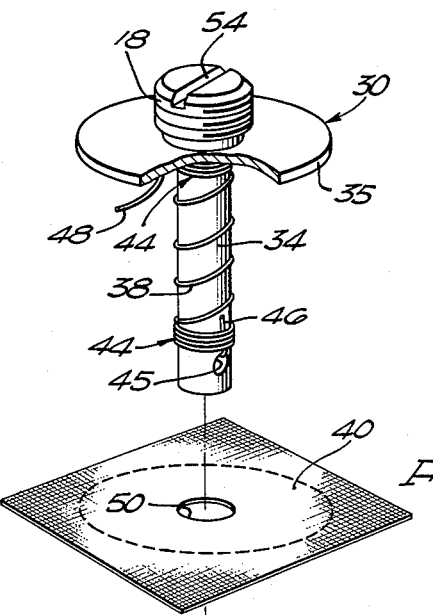
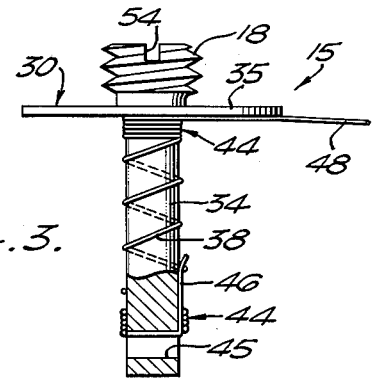
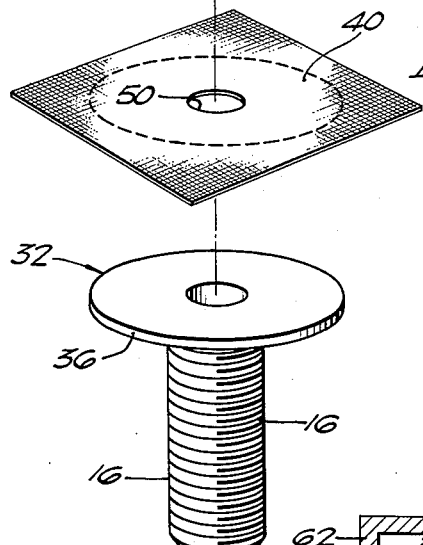
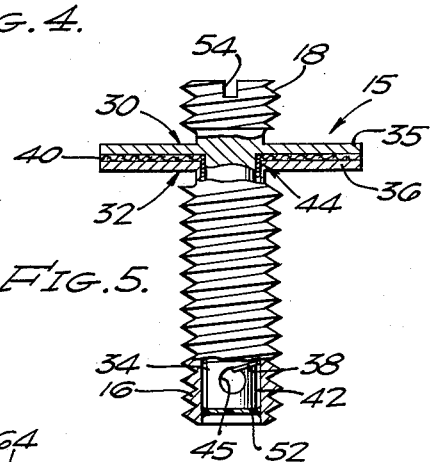
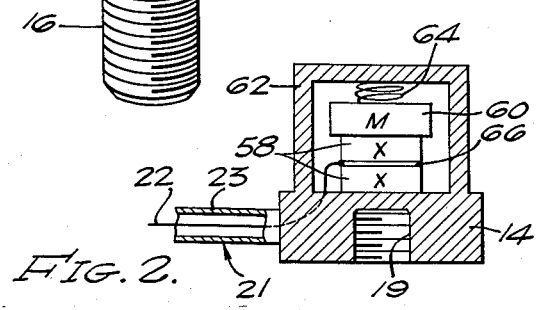
INVENTOR.
BERNARD A. SHOOR
BY
ATTORNEY

United States Patent Office 2,972,006
Patented Feb. 14, 1961

2,972,006
TESTING EQUIPMENT AND INSULATED MOUNTING STUD THEREFOR

Bernard A. Shoor, Pasadena, Calif., assignor to Endevco Corporation, Pasadena, Calif., a corporation of California Filed Nov. 3, 1958, Ser. No. 771,578

11 Claims. (Cl. 174—138)

This invention relates to electrical testing equipment, and more particularly to improvements in electromechanical testing apparatus.

It has been found that the sensitivity and reliability of some electrical testing units, such as piezoelectric accelerometers, can be improved immensely if, when mounted on a structure to be tested, such testing unit is electrically insulated from the test structure. If such an accelerometer is employed in measuring the acceleration of a vibrating structure, when such an accelerometer is mounted directly on the housing of the test structure, without such insulation, spurious signals frequently occur that detract greatly from the sensitivity and reliability of the test device. For example, if a piezoelectric accelerometer is mounted on a large shaking table or a drop tower employed in the testing of the table, the tower or another object mounted thereon, large voltages that occur in the structure may cause significant ground currents that mask or otherwise interfere with the desired accelerometer signals. It has been determined that the adverse effects on such testing equipment that occur under these conditions are not due to signals that are merely induced electrostatically or magnetically in the measuring system, but have their origin in ground loop phenomena.

In any event, the sensitivity and reliability of piezoelectric pickup can be increased by a large factor by electrically insulating the instrument from the metal structure on which it is mounted while maintaining it intimately coupled mechanically thereto.

The general object of the invention is to improve the sensitivity and reliability of electromechanical testing instruments such as accelerometers.

Another object of this invention is to provide an insulated mounting device for eliminating interference from spurious signals that are due to ground-loop effects.

Still another object is to provide such an insulating mounting device which, although providing insulation, still affords a strong coherent mechanical connection between the accelerometer or similar test device and the object whose velocity or vibration rate is being analyzed.

An additional object of the invention is to provide an insulating mounting in the form of a two-piece stud whose parts are rigidly and thoroughly insulated and are separately threaded or otherwise provided with mounting means to be rigidly engaged with the test instrument and with the apparatus to be tested.

Other objects of the invention and various features thereof will become apparent to those skilled in this art upon reference to the following specification and the accompanying drawing wherein a preferred embodiment of the invention is illustrated.

In the drawing:

Fig. 1 is principally a side elevation showing a two-member connecting device of this invention as it is arranged in actual use with one type of electrical test device;

Fig. 2 is a schematic diagram of a piezoelectric accelerometer.

Fig. 3 is principally a side elevation, on an enlarged scale, showing the upper member of the mounting stud of Fig. 1, and indicating one of the operational steps in the manufacture of the device, a portion being broken away at the lower end in order to better illustrate the construction;

Fig. 4 is an exploded view of the two-member stud construction, on the same scale as that of Fig. 2, with the parts arranged in alignment ready to be assembled into the relationship indicated in Fig. 1;

Fig. 5 is a view on the same scale as that of Figs. 2 and 3 with the parts assembled in the operative relationship indicated in Fig. 1, portions being broken away whereby better to illustrate internal structural arrangement.

In Fig. 1 of the drawing there is illustrated an operating assembly employing the mounting of this invention, this assembly including the housing 10 of an accelerometer which is the piece of testing equipment employed. This accelerometer, which is representative of a piezoelectric pickup structure, is shown as being mounted upon the framework or housing 12 of the motor or other structure or object to be tested. Here the accelerometer 10 is provided with a base 14 which normally would be directly mounted upon the structure 12. But according to the present invention, the base 14 is mechanically connected to the structure 12 through the intermediary of the insulating two-piece stud device 15 of this invention. This mounting of the stud structure hereof is effected through the medium of a lower threaded stem 16, threaded into a corresponding bore in the structure 12, the upper end of the insulated stud unit 15 hereof being provided with a short threaded stem 18 received in a corresponding threaded bore 19 in the base 14 of the accelerometer housing 10.

With this particular arrangement, the accelerometer base 14 is provided with an appropriate electrical fitting 20 which receives one end of a typical coaxial cable 21 having the usual central lead or conductor 22 and an outer grounded shield 23. This coaxial cable transmits electrical signals generated by the accelerometer 10 to an amplifier 24, which in turn is connected to a recorder or indicator 25 to make the measurements required. In practice, the amplifier housing 24 is grounded at 26 and the structure 12 being tested is grounded at 27, but the accelerometer housing 10 is not grounded except through its connection to the shield 23 which is grounded at the amplifier 24.

With the described arrangement of Fig. 1, or similar setup employed in testing, ground-loop phenomena could develop when the accelerometer housing 10 is mounted in direct electrical connection with the structure 12. In such a case, electrical voltages that are developed between grounded point 26 and grounded point 27 or between the grounded point 27 and the accelerometer base 14, could generate electric currents in the grounded shield 23, thereby applying stray spurious signals at the input of the amplifier 24. Such electric potentials could easily appear, for example, when an accelerometer is mounted on a part of an airplane engine remote from the point of the engine that is grounded. It is to eliminate spurious signals, which would otherwise affect the readings in the recorder 25, that the present insulated stud 15 is interposed in the position illustrated in Fig. 1, this stud 15 serving to insulate the accelerometer housing 10 electrically but not mechanically from the structure 12 being tested. An accelerometer of the type to which the present invention is applicable is illustrated very schematically in Fig. 2. As indicated there, a pair of oppositely polarized piezoelectric discs 58 are mounted between the base 14 and an inertial member or mass 60 which is mounted in spaced relationship from the top of a rigid case 62 by a soft spring 64. In the present instance, the base 14, the case 62, the inertial member 60, and the spring 64 are all composed of metal and are electrically connected together and to the shield 23 of the cable 21. These parts, therefore, are also in electrically conductive relationship with the outer faces of the two piezoelectric discs 58. The inner faces of the piezoelectric discs 58 are connected to an intervening metallic disc 66 which is electrically connected to the central conductor 22 of the cable 21. Another accelerometer to which this invention is applicable is described in Patent No. 2,714,672 which issued to H. Dudley Wright et al., August 2, 1955. With such an accelerometer, when the structure upon which it is mounted is vibrating, electric potentials are generated across the faces of the piezoelectric discs 58, and these electric potentials are applied across the two conductors 22 and 23.

In view of vibration conditions necessarily existing in the structure 12 being tested, whether it be a motor or other apparatus, the insulated stud assembly 15 must be very compact and rigid and in effect an integral structure, in order to resist vibration effects being transmitted from the apparatus 12 undergoing the test. The present stud 15 meets these requirements over a wide range of frequencies including both low frequencies and other frequencies below a substantial upper limit.

As illustrated in Fig. 3, the present mounting stud 15, which is a two-piece device, includes an upper and inner member 30, and as illustrated in Fig. 5 it also includes a lower and outer member 32. The upper and inner member 30 is an integral structure machined from a single piece of steel. It includes the upper threaded stem 18 and a lower solid spindle or pin 34 which is considerably elongated compared with the threaded stem 18, these two elements 18 and 34 being axially aligned at opposite sides of a laterally or radially directed disc 35 disposed at 90° to the common axis.

The lower member 32 includes the threaded stem 16 which actually is hollow and constitutes a sleeve to receive the pin 34 of the upper members 30. The top portion of the hollow stem 16 is integrally provided with a disc 36 which is perpendicular to the axis of the stem 16 and has the same diameter as that of the disc 35 so that these parts will match and cooperate with each other to provide a single rigid disc structure as seen in Figs. 1 and 5. In effect, the hollow threaded stem 16 is somewhat longer than the solid pin 34, so as to extend beyond the end of pin 34 in Fig. 5.

To effect the required electrical insulation between the upper member 30 of the insulated stud 15 and the lower member 32, the solid pin 34 is wrapped with a fiberglass thread 38, and an insulating glass cloth disc 40 is disposed between the steel discs 35 and 36 of the two members 30 and 32. The glass cloth disc 40 may be initially provided as an oversize square or other piece of glass cloth as seen in Fig. 3, and later trimmed down to the circular form and size illustrated in Figs. 1 and 4. To provide an insulation space between the solid pin 34 and the threaded sleeve 16, the internal diameter of the latter is greater than the external diameter of the pin 34, as best indicated in Fig. 4, whereby to provide an elongated annular space 42 of uniform size. The glass thread 18 is of such a diameter that the thread fills the annular cylindrical space 42, under the pressure and assembly conditions hereof. This insulating thread 38 may be wrapped about the solid pin 34 in any preferred manner. A very desirable structure and arrangement which properly insulates the pin 34 from the outer threaded sleeve 16 is indicated in Figs. 2 and 3. Here, several turns of the thread are provided at the opposite ends of the pin 34, there being a sufficient number of these turns, as indicated at 44 to provide a sufficiently solid wrapping or seat to constitute a solid bed or bearing between the respective opposite ends of the pin 34 and the sleeve 16. While the insulating thread 38 might be continuously wrapped from end to end, nevertheless the wrapping between the portions 44 may be a wide wrapping as illustrated. Desirably, the outer end of the pin 34 is provided with a small transverse hole 45 through which the trailing end of the wrapping thread is passed to position the latter, the extremity 46 thereof being caught under some or all of the turns 44 at the lower end of the pin 34. The lead end 48 of the thread 38 desirably is brought out to the edge of the disc 35 as seen in Figs. 2 and 3 where it is embedded in the woven glass cloth disc 40 in the assembly step now to be described.

At thin layer of insulating thermosetting resin cement, such as epoxy resin cement, is applied to the under face of the disc 35 of the stud member 30, such cement being also applied to the pin 34. The thread 38, which is itself an insulating thread, is embedded in the insulating resin layer, the leading end 48 of the thread being imbedded in the layer of resin cement on the under side of the disc 35. As preferred, the resin cement may be applied to the under side of the disc 35 and to the pin 34 either before or after the thread 38 is wound on the pin 34. A thin layer of the same cement is also applied to the upper face of the disc 36 of the lower stud member 32.

The woven insulating glass fabric piece 40 is then positioned upon the cemented upper face of the disc 36 so that a central hole 50, formed in the piece 40 to match the diameter of the passage through the sleeve 16, registers with the latter. The fabric piece 40 is pressed into place on the disc 36. The inner pin 34 with its wrapped thread 38 is now introduced into the sleeve 16 by presentation of the lower end of the pin 34 to the hole 50 in the cloth piece 40 and the aligned bore in the sleeve 16. The upper stud member 30 is now rotated into position as the pin 34 is forced down into the bore of the sleeve 16, the direction of rotation of course corresponding with the direction of winding of the thread 38. The two parts are worked together into the position shown in Fig. 5, so that the epoxy cement layers completely contact all the elements and imbed the glass insulating material.

The two discs 35 and 36 are pressed as tightly together as possible, and as a result the ends 46 and 48 of the thread are completely imbedded in the overlying portions of the winding 44 and the cloth layer 40, these thread ends thus being, in effect, lost in the assembly. After wiping off any excess cement, the assembly is baked in an appropriate oven at suitable temperatures and for an appropriate time to effect a thorough rigid bonding of all the parts. A suitable setting temperature may be around 300° F. for a time approximating two hours.

The lower open end of the baked unit may be insulated as by applying a coating or layer 52 of an appropriate insulating resin or the like to the extremity of the pin 34 located just within the open end of the threaded sleeve 16.

Inasmuch as the insulating woven cloth 40, which has now been trimmed to the circular form of Fig. 5, and the thread 38, whose leading end 48 has now been trimmed off, are thoroughly embedded in a set and rigid insulating resin, an insulating stud structure 15 is provided which has a high rotating sheer strength at the locus of the glass insulating cloth 40 and also a high pull-out sheer strength at the locus of the wrapped thread 38.

The assembly is now ready for use. Since the outer end of the upper threaded stem 18 is conveniently provided with a screwdriver slot 54, the elongated lower threaded stem 16 may easily be turned into a position in a threaded bore of the structure to be tested, such as indicated in Fig. 1. Thereafter, the accelerometer 10 is turned down onto the upper threaded stem 18 of the insulating stud 15.

With the described insulated construction of the mounting stud 15, the test device 10 or its equivalent is thoroughly insulated from the structure 12 to be tested.

Thus, in accordance with this invention, a mounting stud structure is presented which thoroughly insulates the testing instrument electrically from apparatus being tested without preventing good mechanical connection therebetween. In this way the development of ground loops and the resultant passage of spurious signals between the testing device, such as the accelerometer 10, and the recorder 25, are precluded. For this reason, all ground loop problems and problems from static charges or other objectionable electrical conditions are thereby completely eliminated. But because the stud is a compact, rigid and, in effect, integral mounting structure, it does not seriously modify the mechanical coupling between the accelerometer and the test structure, at least over a very wide frequency range.

Although only one particular form of the invention has been specifically illustrated and described herein, it will be obvious that the invention is not limited thereto but is capable of being embodied in many other forms. Various changes which will therefore now suggest themselves to those skilled in the art may be made in the material form, details of construction, and arrangement of the elements without departing from the scope of the invention.

The invention claimed is:

1. In an electrical mounting:
    a first integral rigid conductor member having a pin, a threaded stem aligned with said pin, and a concentric disc between said pin and said stem;
    a second integral rigid conductor member having a threaded sleeve receiving said pin and a concentric disc at one end of said sleeve;
    an insulating disc between said concentric discs rigidly bonded in insulating relation therewith; and insulating means between said pin and said sleeve rigidly bonded in insulating relation therewith, whereby said two conductors are mutually insulated from each other.

2. A mounting as in claim 1 wherein said insulating disc and said insulating means are fibrous and are embedded in a thermosetting resin bonding the various parts together as a coherent unit.

3. In an insulating mounting for electrical equipment:
    a pin having a stem axially aligned therewith;
    a sleeve having a bore receiving said pin;
    means on said stem for attaching the latter to a test instrument;
    means on said sleeve for attaching the same to an object to be tested;
    a radially extending plate-like member carried by one end of said sleeve;
    a plate-like member extending radially of said pin between said pin and its stem, said plate-like members being disposed closely adjacent each other;
    and insulating means between said plate-like members and between said pin and said sleeve and firmly bonding said plate-like members and said pin and sleeve together into a rigid coherent whole.

4. A mounting as in claim 3 wherein said attaching means are threads.

5. A mounting as in claim 3 wherein said insulating means between said members is a fibrous glass body bonded to said members with a thermosetting resin, and the insulating means between said pin and sleeve is a fibrous glass winding bonded to said pin and sleeve with a thermosetting resin.

6. A mounting as in claim 5 wherein the outer end of said pin within said sleeve carries a layer of insulating material.

7. A mounting as in claim 3 wherein the outer end of said pin within said sleeve carries a layer of insulating material.

8. In a vibration testing system that includes a vibration detector having detecting means for generating electrical signals in response to vibration of an object on which said detector is mounted, the combination therewith of:
    an insulating device rigidly mounting said detector on said object in electrically insulated relationship therewith,
    said insulating device including two opposed members, one having a stem rigidly mounted in said detector and the other having a stem rigidly mounted in said object,
    each said member having a transversely extending disc fixed on its stem, said two discs being disposed closely adjacent each other in axially aligned relation,
    the stem of one of said members being hollow and the other member having a pin rigidly attached thereto, said pin being received in said hollow stem; and
    insulating means disposed between said discs and between said pin and said hollow stem, bonding said discs, said pin, and hollow stem together as a rigid coherent unit.

9. A system as in claim 8 wherein said insulating means in each instance is fibrous glass embedded in set thermosetting insulating resin.

10. A system as in claim 8 wherein said insulating means is a fibrous glass layer embedded in set thermosetting bonding and insulating resin.

11. A mounting as in claim 1 wherein said insulating means is in the form of a thread of fibrous material wound on said pin in helical manner thereby spacing said sleeve from said pin substantially uniformly throughout its entire length.

References Cited in the file of this patent

UNITED STATES PATENTS

| | | |
|---|---|---|
| 1,480,686 | Light | Jan. 15, 1924 |
| 2,451,747 | Kindt | Oct. 19, 1948 |
| 2,619,605 | Lancor | Nov. 25, 1952 |
| 2,677,270 | Sanderson | May 4, 1954 |
| 2,824,243 | Sargeant | Feb. 18, 1958 |